(12) United States Patent  (10) Patent No.: US 8,769,862 B2
Blanchar  (45) Date of Patent: Jul. 8, 2014

(54) BLADE BAIT LURE WITH BARBED TAIL

(76) Inventor: Justin R. Blanchar, Ixonia, WI (US)

( * ) Notice: Subject to any disclaimer, the term of this patent is extended or adjusted under 35 U.S.C. 154(b) by 304 days.

(21) Appl. No.: 13/311,871

(22) Filed: Dec. 6, 2011

(65) Prior Publication Data

US 2012/0167447 A1  Jul. 5, 2012

Related U.S. Application Data

(60) Provisional application No. 61/430,046, filed on Jan. 5, 2011.

(51) Int. Cl.
 *A01K 85/00* (2006.01)
(52) U.S. Cl.
 USPC ........................................ 43/42.09; 43/42.28
(58) Field of Classification Search
 USPC .............. 43/42.09, 42.49, 42.5, 42.52, 42.29, 43/42.24, 42.26, 42.28, 42.37, 44.8
 See application file for complete search history.

(56) References Cited

U.S. PATENT DOCUMENTS

| | | | | |
|---|---|---|---|---|
| 2,766,545 A * | 10/1956 | Wimer | ................. | 43/42.48 |
| D184,271 S * | 1/1959 | Wood | ................. | D22/133 |
| 3,905,149 A * | 9/1975 | McCloud | ................. | 43/44.2 |
| 4,471,556 A * | 9/1984 | Dworski | ................. | 43/42.23 |
| 4,777,758 A * | 10/1988 | Phillips | ................. | 43/42.09 |
| 4,850,132 A * | 7/1989 | Motyka | ................. | 43/44.2 |
| 5,020,265 A * | 6/1991 | Nuckols | ................. | 43/42.39 |
| 5,133,146 A | 7/1992 | Stecher | | |
| 8,020,339 B1 * | 9/2011 | Carter | ................. | 43/42.08 |
| 8,359,782 B1 * | 1/2013 | Alzamora et al. | ................. | 43/42.44 |
| 2002/0032979 A1 * | 3/2002 | Hildman | ................. | 43/43.16 |
| 2009/0211145 A1 | 8/2009 | Thorne | | |

* cited by examiner

*Primary Examiner* — Kimberly Berona
(74) *Attorney, Agent, or Firm* — Absolute Technology Law Group, LLC

(57) ABSTRACT

The present invention relates to a blade bait fishing lure apparatus with a barbed tail for securing interchangeable soft bait components. The blade bait has a plurality of upper apertures for connecting a fishing line and a plurality of lower apertures of attaching fishing hooks. The front end of the blade bait fishing lure includes a weighted component for balancing the blade bait in water.

19 Claims, 4 Drawing Sheets

BLADE BAIT LURE WITH BARBED TAIL

CLAIM OF PRIORITY

Cross-Reference to Related Applications. This application claims priority to U.S. Provisional Application No. 61/430,046 filed on Jan. 5, 2011.

FIELD OF INVENTION

The present invention relates to the field of fishing lures and more particularly to a blade bait lure with barbed tail for securing interchangeable soft bait components.

BACKGROUND

Figure 1:
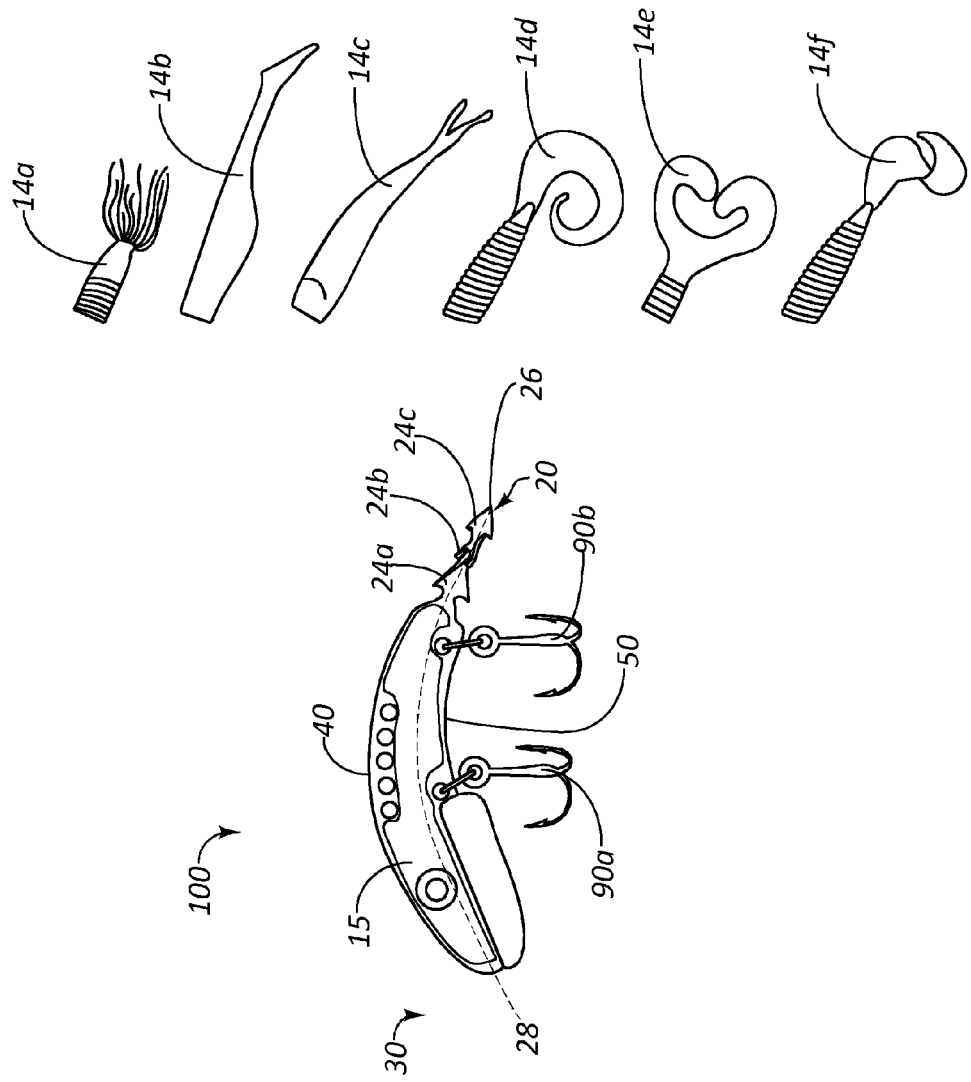
FIG. 1 illustrates a side view of an exemplary embodiment of blade bait lure with barbed tail comprised of a plurality of triangular shaped barb components and a plurality of interchangeable soft bait components.

Blade lures are typically made out of metal with two attached treble hooks. While blade lures are designed to look like fish, the lure is inflexible and the movement of the lure through water does not closely resemble the movement of fish.

Interchangeable soft bait components are flexible lures components available in a large range of colors, scents, sizes, and shapes designed to imitate fish or other natural aquatic food sources. Interchangeable soft bait components are generally designed for use in specific water, light and climate conditions and/or for attracting a particular kind of fish. A variety of soft bait components are known in the art which may be attached to a fish hook. These soft bait components are generally attached to a hook, and do not appear as an integral component of the lure giving a fish like appearance.

It is desirable to have a blade lure which is capable of securing interchangeable soft bait components in a more integral and life like manner which allows a more realistic pattern of movement.

It is also desirable to have an improved method of attachment for soft bait components, which allows a wide variety of soft bait to be combined with blade bait lures.

TERMS OF ART

As used herein, the term "barb" means a point or pointed part projecting backward from a main point, including a hook or arrowhead.

As used herein, the term "blade plate" means a rigid plate for bait, which acts as a tiller. Generally, a blade plate is a flat machined or stamped crescent shaped plate having a smooth arc with a barbed rear and a heavier front portion to which an additional weight component may be attached. The blade plate may have a smooth arc with symmetrical or asymmetrical downwardly sloped sides, and the radius of the concave curve may vary. In various embodiments, the blade plate may act as the tiller for a lure assembly. The body generally includes at least one top aperture for attaching a line and at least one bottom aperture is for attaching a hook.

As used herein, the term "hook aperture" means any opening, hole, slit, or crack which is adapted to receive a fish hook.

As used herein, the term "interchangeable soft bait component" means any flexible artificial fishing bait including deformable and gel-like plastics which emulate worms, minnows, insects and other live bait.

As used herein, the term "piercing point" means the terminating end of a barb which enters a soft bait component.

As used herein, the term "towing aperture" means any hole, slit, gap, to which a fishing line is attached.

SUMMARY OF THE CLAIMED INVENTION

The present invention is a blade bait apparatus comprised of single blade plate having a curved front end and a barbed tail end. The barbed tail end is comprised of a plurality of serially aligned barb members terminating in a piercing point. The blade plate further includes at least one upper edge aperture and at least one lower edge aperture.

The blade bait apparatus is advantageous because it is capable of securing interchangeable soft bait components in a more integral and life like manner which allows a more realistic pattern of movement.

Further, the present invention is advantageous because it is an improved method of attachment for soft bait components, which allows a wide variety of soft bait to be combined with blade bait lures.

DETAILED DESCRIPTION OF INVENTION

For the purpose of promoting an understanding of the present invention, references are made in the text to exemplary embodiments of blade bait lure with barbed tail for securing interchangeable soft bait components, only some of which are described herein. It should be understood that no limitations on the scope of the invention are intended by describing these exemplary embodiments. One of ordinary skill in the art will readily appreciate that alternate but functionally equivalent shapes, materials and designs may be used. The inclusion of additional elements may be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

It should be understood that the drawings are not necessarily to scale; instead, emphasis has been placed upon illustrating the principles of the invention. In addition, in the embodiments depicted herein, like reference numerals in the various drawings refer to identical or near identical structural elements.

Moreover, the terms "substantially" or "approximately" as used herein may be applied to modify any quantitative representation that could permissibly vary without resulting in a change in the basic function to which it is related.

FIG. 1 illustrates a side view of an exemplary embodiment of blade bait apparatus 100 with a plurality of interchangeable soft bait components 14a, 14b, 14c, 14d, 14e and 14f. In the embodiment shown, blade bait 100 is generally comprised of crescent or smooth arc shaped blade plate 15, having a lighter weight barbed end and heavier weight front end which may include an additional weight component. In the exemplary embodiment, crescent shaped blade plate 15 is a curved component with front end 30 and barbed tail 20. In the embodiment shown, crescent shaped blade plate 15 has convex top edge 40 and concave bottom edge 50.

As illustrated in the embodiment, barbed tail 20 is comprised of three triangularly shaped barbs, 24a, 24b and 24c. In various embodiments, barbed tail 20 may have more or fewer barbs. In other embodiments, barbed tail 20 may be slightly twisted. Barbs 24a, 24b, and 24c are triangular shaped components having upper and lower projections which point backward from the tail direction. In various embodiments, the barb at the end of tail 20 (shown in FIG. 1 as barb 24c) is smaller than the other barbed members (shown in FIG. 1 as barbs 24a and 24b).

The embodiment shown also illustrates a plurality of interchangeable soft bait components 14a-f which are adapted for placement on blade bait 100. In the embodiment shown, interchangeable soft bait components 14a-f may be slipped easily onto barbed tail 20 because of the ciritical placement of three identically triangular shaped barbs 24a, 24b and 24c which are connected in a point-to-base alignment along curved axis 28 and which terminates at piecricing point 26. Each interchangeable soft bait component 14a-f may be inserted onto entry barb 24c and seperated using piercing point 26. In the embodiment shown, barbs 24a, 24b, and 24c may secure interchangeable soft bait components 14a-f by creating a pressure interface on the inside of the deformable soft bait by a plurality of equidistantly spaced concave barb components.

Figure 2:
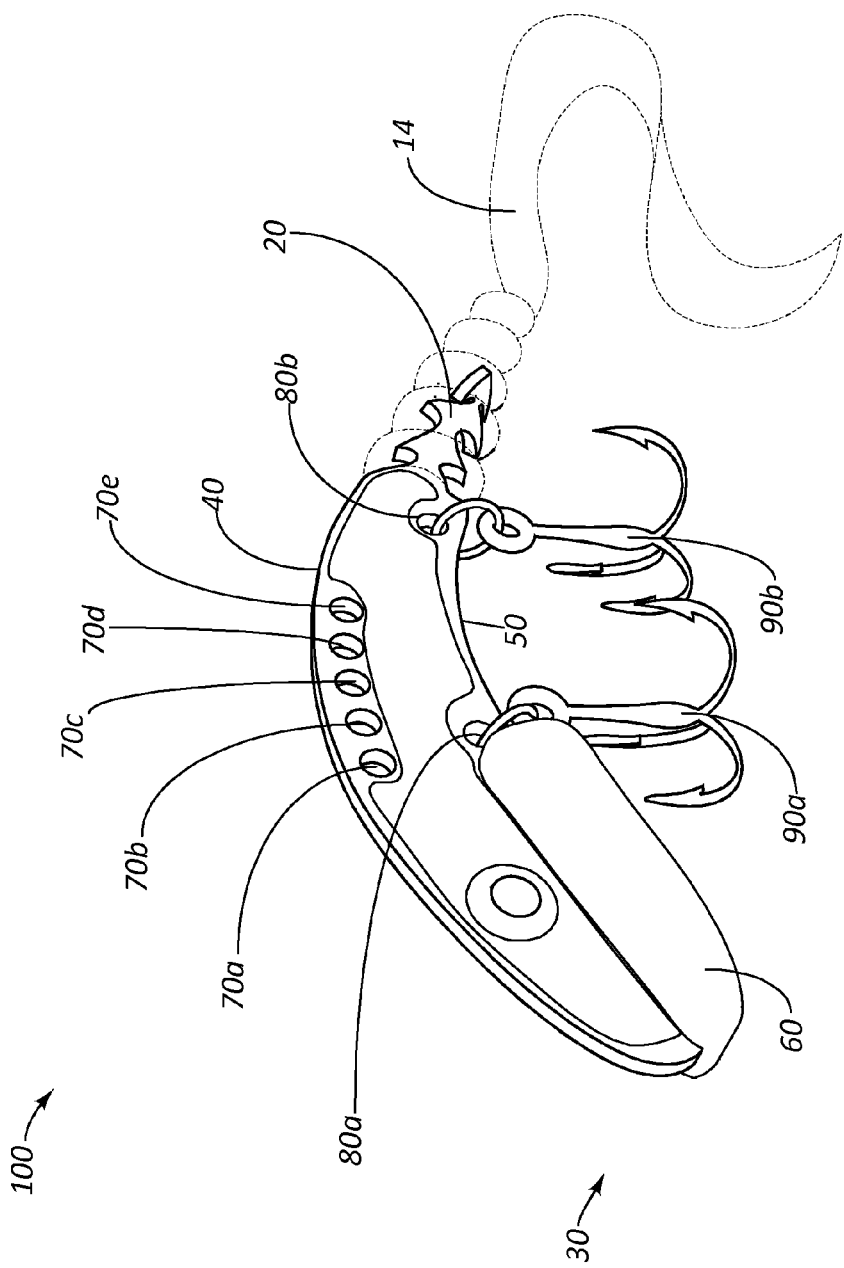
FIG. 2 illustrates a side perspective view of an exemplary embodiment of front weighted blade bait lure apparatus with one interchangeable soft bait component securely attached by a plurality or piercing points.

FIG. 2 illustrates a side perspective of a preferred embodiment which shows the attachment of interchangeable soft bait component 14 on barbed tail 20, including a series of piercing point interfaces along the inner surface of interchangeable soft bait component 14. An advantage of the present invention is that tail end 20 engages the soft bait by piercing it, without compromising its functionality. As shown in the embodiment, interchangeable soft bait component is attached by a plurality or piercing points along upper and lower surface of barbed tail 20 as well as and a pressure interface due to the expansion of deformable plastic.

In the embodiment shown, crescent shaped blade plate 15 has five towing apertures 70a, 70b, 70c, 70d and 70e along convex top edge 40. Towing apertures 70a, 70b, 70c, 70d and 70e are used for attaching a fishing line (not shown) to crescent shaped blade plate 15. Because the contour and design of crescent shaped blade plate 15, a critical fifth towing aperture 70e is possible, which creates added resistance and lifts the bait when securing interchangeable soft bait component 14. Other designs known in the art may accommodate only four towing holes.

In the embodiment shown, crescent shaped blade plate 15 also includes hook apertures 80a and 80b which are used to secure hooks 90a and 90b. In other embodiments, various types of hooks may be used on blade bait 100. In other embodiments, crescent shape blade plate 15 may include more or less than two hook apertures.

In the embodiment shown, crescent shaped blade plate 15 has weighted front component 60. Weighted front component 60 is a smooth curved cylindrical projection from crescent shaped blade plate 15 on concave bottom edge 50 near front end 30. Weighted section 60 is solid material and used to balance the lure by placing weight near front end 30. In other embodiments, additional weighted sections may be added to blade bait 100.

Figure 3:
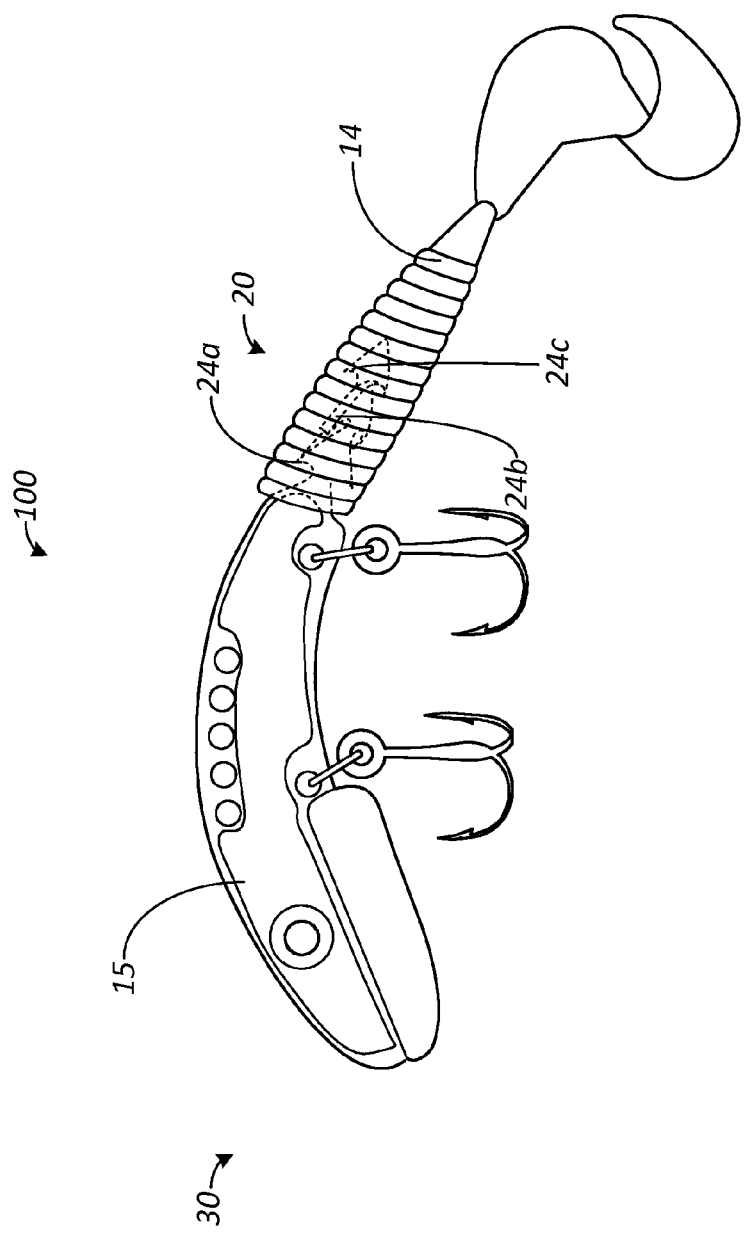
FIGS. 3 and 4 illustrate side views of exemplary embodiments of a smooth arc blade bait lure apparatus with interchangeable soft bait component and barbed tail shown in phantom.
Figure 4:
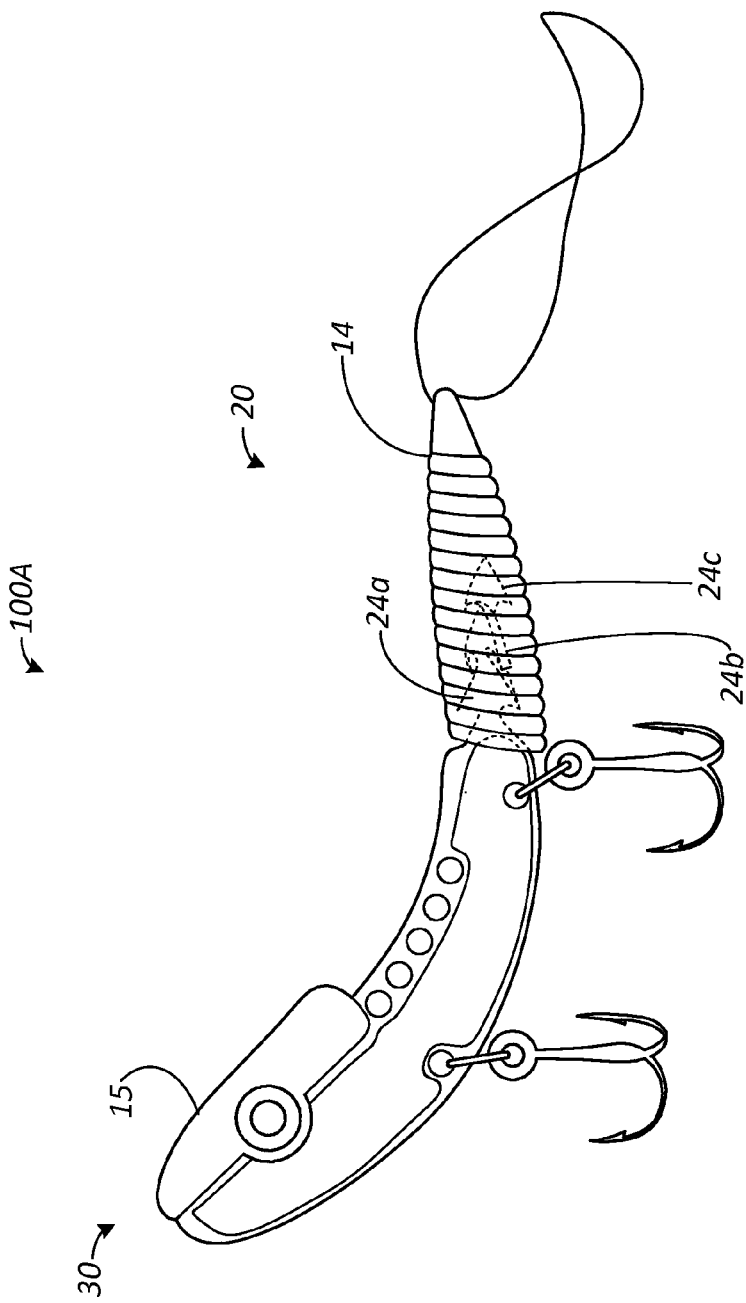

FIG. 3 illustrates a perspective view of an exemplary embodiment of blade bait 100 with barbed tail 20. In the embodiment shown, interchangeable soft bait component 14 is secured on barbed tail 20 by a plurality of piercing points on the internal surface of interchangeable soft bait component 14 when it is stretched to fit onto barbed tail 20. In the embodiment shown, interchangeable soft bait component 14 is a solid component made of a gel-like plastic. Piercing point 26 may puncture a narrow hole in interchangeable soft bait component 14 as it is slipped over barbed tail 20. Because of its elastic nature, the inside of interchangeable soft bait component 14 will compress around barbs 24a-c and create a pressure interface with the plurality of upper and lower pointed projections. Barbs 24a-c ensure that interchangeable soft bait component 14 remains securely attached to blade bait 100 while in the water. Interchangeable soft bait component 14 may be removed from barbed tail 20 and multiple other soft bait components may be attached.

In the embodiment shown, the addition of interchangeable soft bait component 14 to blade bait 100 enhances the movement of blade bait 100 and increases the visibility of the lure to better attract fish. In addition, the interchangeability allows the user to select the interchangeable soft bait component based on the water conditions and the type of fish sought.

What is claimed is:

1. A blade bait apparatus comprised of:
a single blade plate having a curved front end and a barbed tail end;
wherein said curved front end includes at least one weighted component attached to said curved front end;
wherein said weighted component is a smooth curved cylindrical projection from said curved front end;
wherein said barbed tail end is comprised of a plurality of serially aligned barbed members and a piercing point;
wherein said barbed tail end forms a spiral curvature about the longitudinal axis; and
wherein said blade plate further includes at least one upper edge aperture and at least one lower edge aperture.

2. The apparatus of claim 1, wherein said blade plate is configured in an asymmetrical crescent shape with said curved front end and said barbed tail end.

3. The apparatus of claim 1, wherein said barbed tail end is comprised of at least three triangularly shaped barbs.

4. The apparatus of claim 3, wherein said at least three triangularly shaped barbs are joined in a point-to-base configuration.

5. The apparatus of claim 1, wherein said plurality of serially aligned barbed members are aligned along a central axis of curvature.

6. The apparatus of claim 5, wherein said central axis of curvature terminates in a piercing entry barb.

7. The apparatus of claim 1, wherein said curved front end of said blade plate is heavier than sad barbed tail end.

8. The apparatus of claim 1, which further includes a plurality of weighted components fixedly attached to said curved front end.

9. The apparatus of claim 1, wherein said blade plate has five upper apertures.

10. The apparatus of claim 1, which further includes a plurality of selectively attachable soft bait components.

11. The apparatus of claim 10, wherein said selectively attachable soft bait components have a deformable inner surface.

12. The apparatus of claim 10, wherein said plurality of serially aligned barbed members contact and engage the inner surface of said selectively attachable soft bait components.

13. The apparatus of claim 1, wherein said blade plate is a stamped metal plate.

14. The apparatus of claim 1, wherein said blade plate is a machined metal plate.

15. The apparatus of claim 1, wherein said plurality of serially aligned barbed members further includes a barb at the end of said tail end which is smaller than said plurality of serially aligned barbed members.

16. The apparatus of claim 1, wherein said piercing point terminates at a point along an axis parallel to the front end of said blade plate.

17. A multi-curved blade bait system comprised of:
a thin curved component having a curve-shaped top edge, and a curved tail end to which a plurality of barbs are attached on an axis of curvature;
wherein a curved front end of said thin curved component includes at least one weighted component attached to said curved front end;
wherein said weighted component is a smooth curved cylindrical projection from said curved front end;
wherein said axis of curvature terminates in a piercing point;
wherein said curved tail end forms a spiral curvature about the longitudinal axis;
a plurality of selectively attachable soft bait components; and
at least four apertures in said thin curved component along said curve-shaped top edge.

18. The system of claim 17, wherein said curved front end has a convex upper edge and a concave lower edge.

19. The system of claim 17, wherein said curved front end has a concave upper edge and a convex lower edge.

\* \* \* \* \*